United States Patent
Hershberger et al.

(10) Patent No.: US 9,481,559 B2
(45) Date of Patent: Nov. 1, 2016

(54) DRAFT BEER SUPPLY CHAIN SYSTEM AND METHOD

(71) Applicant: SteadyServ Technologies, LLC, Carmel, IN (US)

(72) Inventors: Steve Hershberger, Carmel, IN (US); Steve Kremer, Carmel, IN (US); Matt Mayer, Westfield, IN (US); Mark Kosiarek, Fishers, IN (US)

(73) Assignee: STEADYSERV TECHNOLOGIES, LLC, Carmel, IN (US)

( * ) Notice: Subject to any disclaimer, the term of this patent is extended or adjusted under 35 U.S.C. 154(b) by 67 days.

(21) Appl. No.: 14/193,697

(22) Filed: Feb. 28, 2014

(65) Prior Publication Data
US 2014/0174568 A1 Jun. 26, 2014

Related U.S. Application Data

(63) Continuation of application No. 13/837,639, filed on Mar. 15, 2013.

(60) Provisional application No. 61/651,531, filed on May 24, 2012.

(51) Int. Cl.
| | |
|---|---|
| *G05B 23/00* | (2006.01) |
| *B67D 1/08* | (2006.01) |
| *G01D 4/00* | (2006.01) |
| *G06Q 10/08* | (2012.01) |

(52) U.S. Cl.
CPC ............ *B67D 1/0878* (2013.01); *G01D 4/002* (2013.01); *G06Q 10/08* (2013.01); *G06Q 10/087* (2013.01); *Y10T 137/8342* (2015.04)

(58) Field of Classification Search
CPC . B67D 1/0829; B67D 1/0878; B67D 1/0888
See application file for complete search history.

(56) References Cited

U.S. PATENT DOCUMENTS

| | | | |
|---|---|---|---|
| 4,869,396 | A | 9/1989 | Horino et al. |
| 4,997,012 | A | 3/1991 | Kuziw |
| D327,604 | S | 7/1992 | Culverson |
| D331,349 | S | 12/1992 | Culverson |
| 5,614,278 | A | 3/1997 | Chamberlain et al. |
| 5,986,219 | A | 11/1999 | Carroll et al. |
| 6,546,795 | B1 | 4/2003 | Dietz |

(Continued)

FOREIGN PATENT DOCUMENTS

| | | |
|---|---|---|
| CN | 2893668 | 4/2007 |
| CN | 201043914 | 4/2008 |

(Continued)

OTHER PUBLICATIONS

International Preliminary Report on Patentability, PCT/US2013/042725 Dec. 4, 2014.

(Continued)

*Primary Examiner* — Omeed Alizada
(74) *Attorney, Agent, or Firm* — Dorsey & Whitney LLP

(57) ABSTRACT

A device for measuring a keg for beer is disclosed. The keg has a tap opening at its top and a recessed cavity at its bottom. The recess is defined in part by an inside wall around the bottom of the keg. The measuring device disclosed may have an mountable/unmountable housing adapted to be installed to the keg by being mounted on the bottom of the keg at least in part in the recessed cavity. The measuring device disclosed may have a weight sensor on the housing for sensing the weight of the keg.

14 Claims, 9 Drawing Sheets

(56) References Cited

U.S. PATENT DOCUMENTS

| | | |
|---|---|---|
| 6,580,357 B1 | 6/2003 | Forster et al. |
| 6,847,912 B2 | 1/2005 | Forster |
| 6,938,488 B2 | 9/2005 | Diaz et al. |
| 7,107,836 B2 | 9/2006 | Brookner |
| 7,255,003 B2 | 8/2007 | Schneiter |
| 7,458,260 B2 | 12/2008 | Roesner |
| 7,471,208 B1 | 12/2008 | Hoben et al. |
| 7,565,240 B2 * | 7/2009 | Tomizawa ......... G01C 21/3617 340/995.19 |
| 7,814,786 B2 | 10/2010 | Woodard |
| 7,821,410 B2 | 10/2010 | Higashionji et al. |
| 7,855,637 B2 | 12/2010 | Forster |
| 9,221,667 B2 | 12/2015 | Hershberger et al. |
| 2003/0172745 A1 | 9/2003 | Mitchinson |
| 2005/0000737 A1 | 1/2005 | Fox et al. |
| 2005/0120793 A1 | 6/2005 | Cochran, Jr. et al. |
| 2005/0197738 A1 | 9/2005 | Morrison et al. |
| 2006/0038684 A1 * | 2/2006 | Lahiri .................... B65D 79/02 340/572.1 |
| 2007/0056368 A1 | 3/2007 | Schneiter |
| 2007/0088681 A1 * | 4/2007 | Aravamudan ...... G06F 17/3056 |
| 2007/0215239 A1 | 9/2007 | Dorney |
| 2009/0261981 A1 | 10/2009 | Jones et al. |
| 2010/0089943 A1 | 4/2010 | Till |
| 2010/0125362 A1 | 5/2010 | Canora et al. |
| 2010/0147894 A1 | 6/2010 | Reimann et al. |
| 2010/0226100 A1 | 9/2010 | Johnson et al. |
| 2011/0029255 A1 | 2/2011 | Hyde et al. |
| 2012/0019398 A1 | 1/2012 | Vogt et al. |
| 2012/0059513 A1 | 3/2012 | Perkins et al. |
| 2012/0189762 A1 * | 7/2012 | Reineccius .............. A01C 1/06 427/4 |
| 2012/0269150 A1 | 10/2012 | Delorme et al. |
| 2013/0314244 A1 | 11/2013 | Hershberger et al. |
| 2014/0166374 A1 | 6/2014 | Deng et al. |
| 2015/0109143 A1 | 4/2015 | Hershberger et al. |

FOREIGN PATENT DOCUMENTS

| | | |
|---|---|---|
| CN | 201335732 | 10/2009 |
| CN | 201724716 | 1/2011 |
| CN | 201837448 | 5/2011 |
| CN | 202057402 | 11/2011 |
| CN | 202720033 U | 2/2013 |
| CN | 201220296045.4 | 2/2013 |
| JP | 2001229466 | 8/2001 |
| WO | 2006009841 | 1/2006 |
| WO | 2013177554 A1 | 11/2013 |
| WO | 2013189207 | 12/2013 |

OTHER PUBLICATIONS

International Search Report and Written Opinion, PCT/US2013/042725 Sep. 13, 2013.
International Search Report and Written Opinion for PCT/US2014/063645 mailed Feb. 17, 2015.
Supplementary European Search Report received for EP 1379343 dated Jan. 14, 2016.
Ranasinghe, et al., "Building Radio Frequency Identification for the Global Environment Sensor-enabled RFID Tag Handbook" dated Jan. 15, 2008.
Rotunno, Tom , "http://www.cnbc.com/2015/10/05/out-of-beer-bud-lights-smart-fridge-will-tell-you.html", CNBC, downloaded Oct. 5, 2015.

* cited by examiner

I. COMPONENT ASSEMBLY INSTRUCTIONS
AL BASE-BEER KEG ASSEMBLY

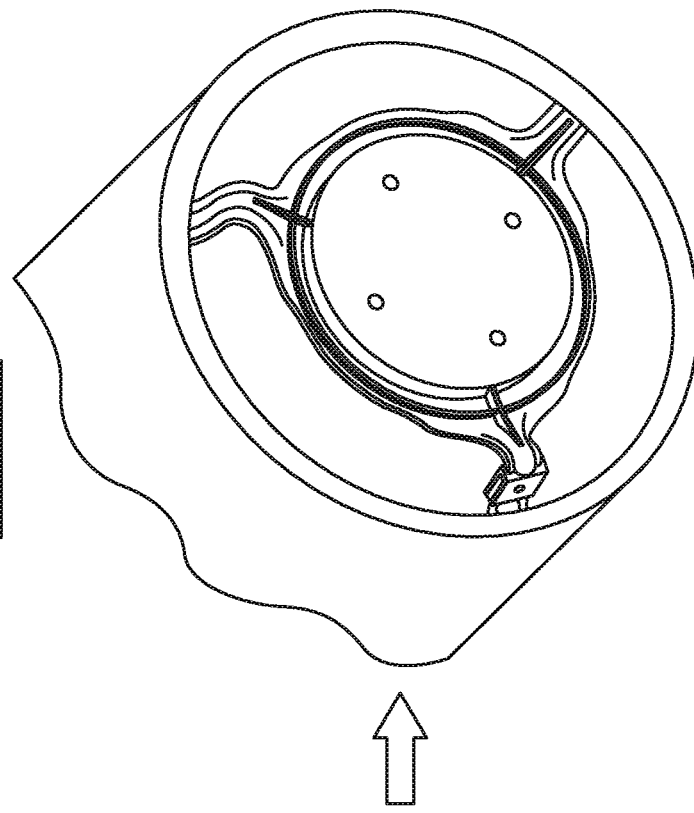
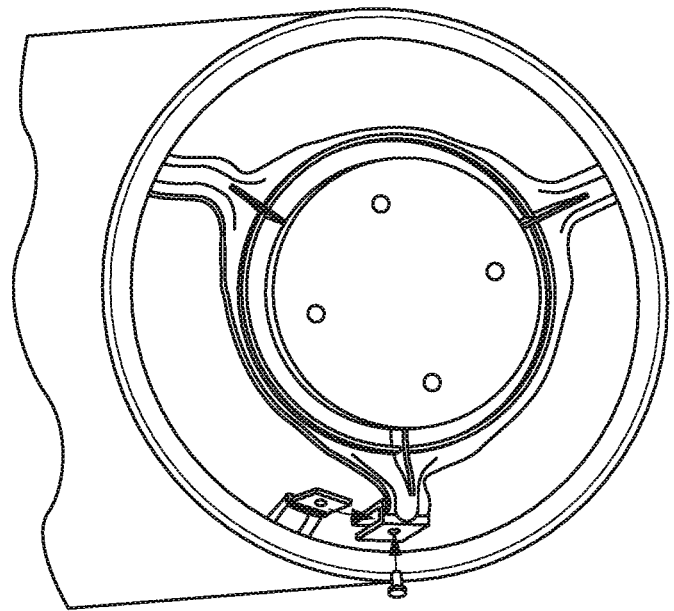
FIG. 3

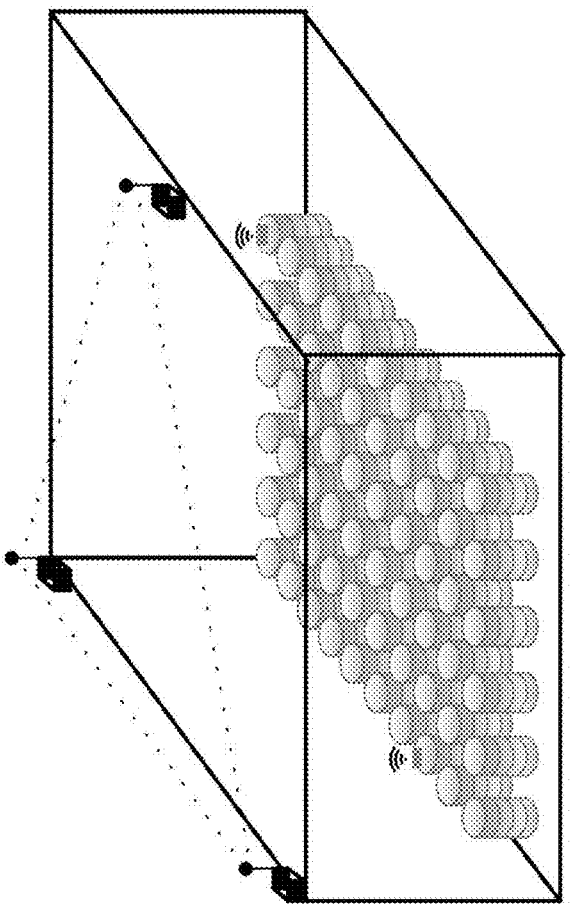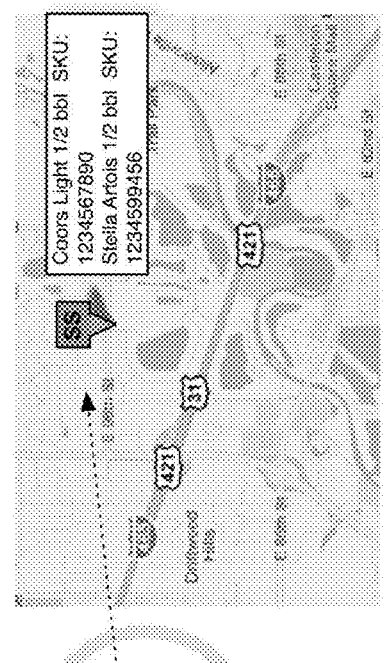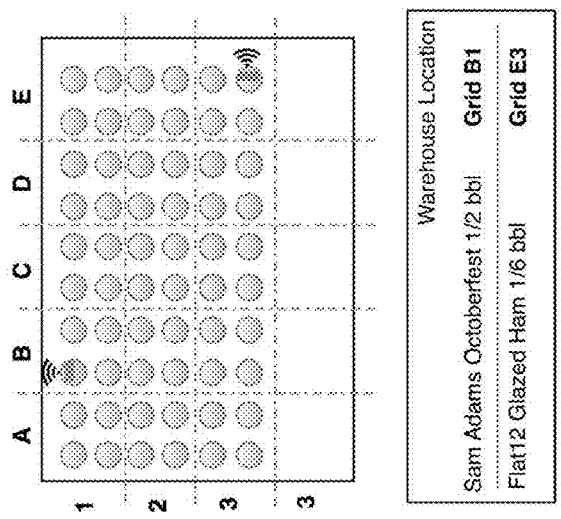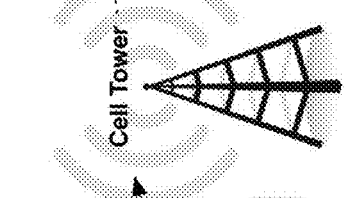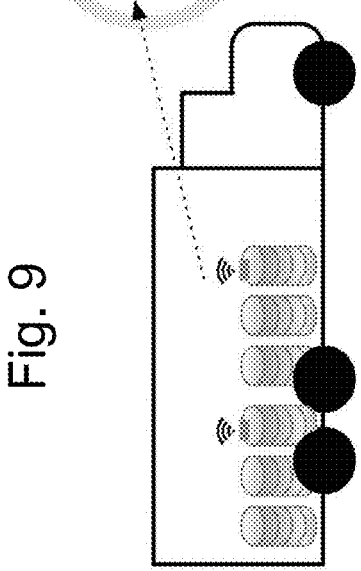
Fig. 9

DRAFT BEER SUPPLY CHAIN SYSTEM AND METHOD

This application is a continuation of U.S. patent application Ser. No. 13/837,639, filed Mar. 15, 2013, which claims the benefit of U.S. Provisional Application No. 61/651,531, filed May 24, 2012. U.S. Provisional Application No. 61/651,531, filed May 24, 2012, is hereby incorporated herein by reference. U.S. patent application Ser. No. 13/837,639, filed Mar. 15, 2013, is not incorporated herein by reference. Any disclaimer that may have occurred during the prosecution of the above-referenced application(s) is hereby expressly rescinded.

FIELD

The present inventions relate to managing information related to draft (draught) beer inventory and distribution. More specifically, the present inventions relate to monitoring of draft beer and other bulk beverage inventories, and to related data analysis, including automated ordering, prompting for ordering, and mobile marketing.

BACKGROUND

The draft beer industry employs re-usable aluminum kegs to distribute draft beer. The kegs are simple aluminum vessels that can be filled with beer, pressurized, and then the beer flows out of a top-mounted valve/spout. The keg typically embodies no technology beyond a simple pressure valve/spout on the top.

Kegs are often designed with a spherical round bottom that is then surrounded or collared with a round aluminum sheath that allows the keg to sit upright and level. This collar on the bottom of the keg, combined with the spherical round bottom, creates a constructed void or space under the keg. All kegs have this empty space under the main container portion.

SUMMARY

The present invention is set forth by the claims, and only the claims. One aspect of the invention may include a device for measuring a keg for beer. The keg has a tap opening at its top and a recessed cavity at its bottom. The recess is defined in part by an inside wall around the bottom of the keg. The device may comprise an mountable/unmountable housing adapted to be installed to the keg by being mounted on the bottom of the keg at least in part in the recessed cavity. The device also may comprise a weight sensor on the housing for sensing the weight of the keg. These and other aspects, as claimed, provide an improved device, method and/or system for measuring beverages, such as beer, in kegs.

BRIEF DESCRIPTION OF THE DRAWINGS

FIGS. 2-3 illustrate installation of one form of pressure sensor on the bottom of the keg.

FIG. 9 illustrates a keg location monitoring system in a third embodiment.

DESCRIPTION

Figure 1:
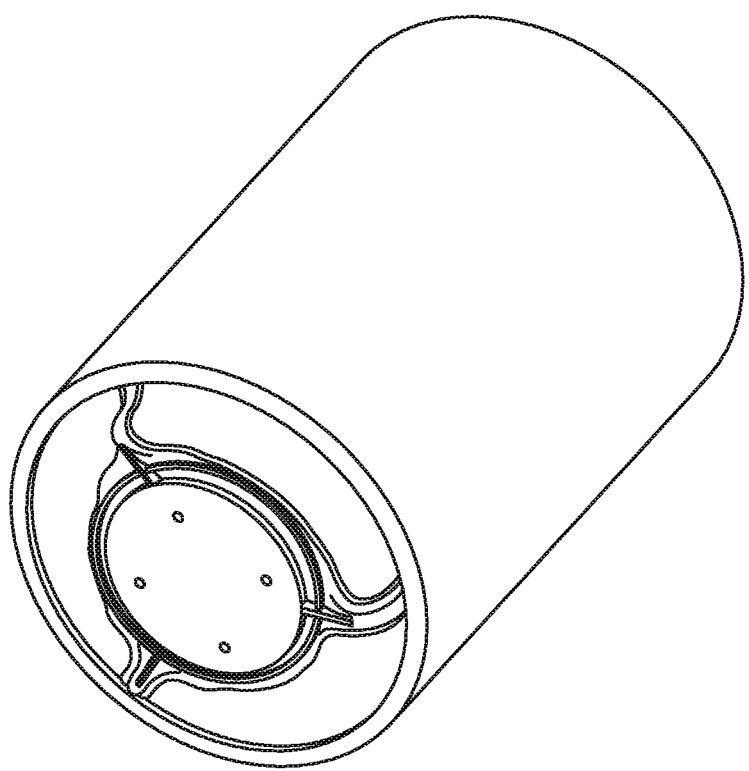
FIG. 1 is a perspective view of a pressure sensor installed on the bottom of a keg.

For the purpose of promoting an understanding of the principles of the present disclosure, reference will now be made to the embodiment(s) illustrated in the drawings, and specific language will be used to describe the same. It will, nevertheless, be understood that no limitation of the scope of the disclosure is thereby intended; any alterations and further modifications of the described or illustrated(s), and any further applications of the principles of the teaching as illustrated therein are contemplated as would normally occur to one skilled in the art to which the disclosure relates.

Generally, one form of the present system uses on-keg monitoring devices to keep track of substantially real-time levels of draft beer in inventories of on-premise beer retailers. Data collector(s) at each site periodically transmit the data to a centralized data storage and processing facility. Alerts are sent to key personnel when it is time to place another order, and supply chain mechanisms leverage the data for efficient resource planning and movement at all stages. Consumers are able to find favorite beers by accessing the inventory data through a mobile app, and other uses are made of the collected data.

The draft beer industry employs re-usable aluminum kegs to distribute draft beer. The kegs are simple aluminum vessels that can be filled with beer, pressurized, and then the beer flows out of a top-mounted valve/spout. The keg typically embodies no technology beyond a simple pressure valve/spout on the top.

Kegs are often designed with a spherical round bottom that is then surrounded or collared with a round aluminum sheath that allows the keg to sit upright and level. This collar on the bottom of the keg, combined with the spherical round bottom, creates a constructed void or space under the keg. All kegs have this empty space under the main container portion.

Figure 2:
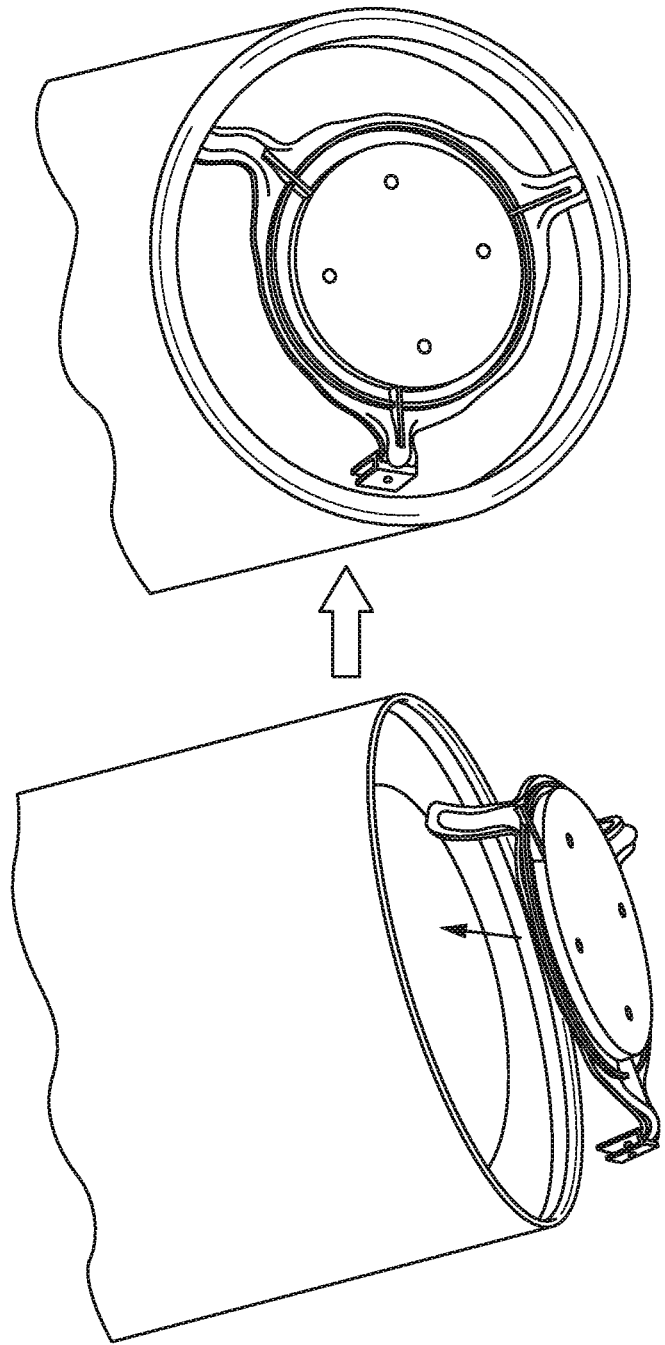

One innovation of the present system is a Keg Sensor/Transmitter (see FIG. 1) that fits in this space under the bottom of the keg. In one embodiment, illustrated in FIG. 2, the Keg Sensor/Transmitter consists of two main parts. The sensor part is a pressure sensor, which in this embodiment is an analog electronic device that converts weight into an analog value calibrated to the weight of a full keg. When the sensor is mounted to the bottom of the keg, the sensor weight element rests on the floor. In some use scenarios, kegs are stacked on top of each other. In such situations, the system vendor will supply a rigid, hard plastic mat (not shown) that will fit on the top of a keg to provide a hard, level surface for the Keg Sensor/Transmitter on the next layer up to sit on.

The sensor registers pressure from the weight of the keg. In the case of a full keg that has a maximum volume and weight, the sensor registers a maximum analog value, which is converted in the present embodiment into a digital value by an analog-to-digital converter (ADC) onboard the microcontroller chip in the sensor/transmitter unit. In some embodiments, the conversion uses and 8-bit value, while in others, another range of digital outputs (such as 0-20) is used. Using this latter form as an example, as the keg is depleted, the value changes from 20 to 19, 18, 17, etc. all the way down to 0 (zero), which is the value corresponding to the weight of an empty keg. The Keg Sensor/Transmitter electronics communicate the weight value of 0-20 to the Keg Transmitter. The Keg Transmitter is also housed in the bottom of the keg and in this embodiment is connected by wire to the Keg Sensor. In the present embodiment, the Keg Transmitter uses Zigbee wireless data transmission technology to join a wireless mesh network with the local Uplink/Gateway, though other wireless data transmission technologies could be used as will occur to those skilled in the art in view of the present disclosure.

In this embodiment, the Keg Transmitter also has flash memory that has been preprogrammed with several software parameters. One of these parameters is a Serial Number corresponding to the individual Keg Sensor/Transmitter. That is, each and every Keg Sensor Transmitter has its own unique Serial Number that is programmed into the software when the unit is manufactured. In addition to the Serial Number, the software version number is pre-programmed. The Keg Transmitter software is also programmed with certain functions and intelligence. In this embodiment, the software is programmed at the factory to perform various functions, including waking itself up every X number of hours and transmitting a signal via Zigbee to check whether it is in range of an Uplink/Gateway. When the transmitter is shipped to an equipped warehouse, the Keg Transmitter will first wake up and connect with an Uplink/Gateway. At that point, the Keg Transmitter will begin to check for an Uplink/Gateway every hour.

The Keg Sensor/Transmitters are sent in quantity to the beer distributor's warehouse. At the beer distributor's warehouse, the Keg Sensor Transmitter is married/installed to a keg. For example, in this embodiment, the Keg Sensor/Transmitter is mounted on the bottom of the keg in the recessed cavity that is created where the convex portion of the keg comes in contact with the outer edge. The keg has a molded lip on the outer portion of the keg that allows a tongue-and-grove fitting to be pushed into place. To achieve the fitting of the Keg Sensor/Transmitter to the bottom of the keg, one may use a suitable Keg Installer, which will now be described in view of FIG. 5.

The Keg Installer in this embodiment is a fabricated aluminum and steel platform consisting of three large pieces: the Inbound Ramp, the Plateau, and the Outbound Ramp. The Inbound Ramp is approximately four feet wide and six feet long. The Inbound Ramp has a total of approximately 20 rubber rollers with each roller approximately 4 inches in width. The rollers are mounted on aluminum rails spaced exactly the width of a beer keg. There is a hollow space between the rails. There are 10 rollers on the left rail and 10 rollers on the right rail. The beginning part of the Inbound Ramp uses small rollers that start at floor level. The Inbound Ramp is on an incline starting at floor level then rising to approximately 5 inches off of the ground.

In use, a beer distributor warehouse worker moves a full keg of beer to the beginning of the Inbound Ramp and positions the keg in the middle of the ramp. The worker then slightly tips the keg and scoots it forward so the keg rests on the first rubber rollers of the Inbound Ramp. The worker then pushes the keg up the Inbound Ramp as it rolls on the rubber rollers.

The Inbound Ramp in this embodiment is bolted directly to the Plateau portion of the keg Installer. The Plateau has approximately 12 rollers—6 rollers on the left rail and 6 rollers on the right rail. The rails and rollers in this embodiment match up exactly in alignment with the rails and rollers on the Inbound Ramp.

The Outbound Ramp in this embodiment is approximately four feet wide and six feet long and is bolted directly to the Plateau portion of the Keg Installer. The Outbound Ramp has approximately 20 rollers with each roller approximately 4 inches in width. There are 10 rollers on the left rail and 10 rollers on the right rail. There is an open space between the rails. The rails and rollers match up exactly in alignment with the rails and rollers on the Plateau. The Outbound Ramp is on a decline starting at approximately 5 inches off of the ground going down to floor level.

In the open space between the rails on the Outbound Ramp is a Keg Sensor/Transmitter Installation device. A Keg Sensor/Transmitter that is ready to be installed on to a keg is placed into the platform device between the rails. As the keg descends the Outbound Ramp the weight of the keg pushes down on the installation device platform triggering a hydraulic lever. That lever flexes the Keg Sensor/Transmitter housing and pushes the Keg Sensor/Transmitter housing into the cavity in the bottom of the keg. The hydraulic lever then un-flexes the Keg Sensor/Transmitter housing, and the housing snaps into place in the keg bottom cavity.

The warehouse worker then continues to move the keg down the Outbound Ramp to floor level. The keg now has the Keg Sensor/Transmitter installed, and it is ready to be delivered to the retailer. The warehouse worker now can put a new Keg Sensor/Transmitter into the Keg Installer and repeat the process.

Once a keg is empty, it will be picked up by the beer distributor delivery driver to be returned to the beer distributor warehouse. Since the keg is now empty, the keg is very light and can be easily picked up and turned over by the delivery driver or warehouse employee. The Keg Sensor/Transmitter will have the bar code or QR code assigned to it in the distributor's inventory system. The Keg Sensor/Transmitter in this embodiment will be taken off of the keg by hand and will be put in one of four bins.

Bin #1: The sensor is good and can be re-used. It is put in a bin labeled with the beer brand and type.

Bin#2: The beer brand and type is no longer in distributor inventory. The warehouse employee uses the SaaS Software to re-assign the Keg Sensor/Transmitter's individual serial number to the SKU associated with another beer brand and type.

Bin #3: The bar code is faded and needs to be replaced.

Bin#4: The battery life of the sensor has exceeded normal life, and the sensor needs to be returned to the system vendor.

At system initialization, the SaaS database will be populated with all of the current beer brand and type SKUs. As time goes by, however, new beer SKUs will appear. Each beer distributor warehouse and accounting employee on the overall system can enter in new beer brands and types with their corresponding SKUs. These new SKUs will be made available to all beer distributor users across the entire overall system. That is, the process of updating new SKU's into the SaaS system will be crowdsourced.

The Keg Installer in the embodiment just described is made of three pieces—the Inbound Ramp, the Plateau, and the Outbound Ramp—so that it can be easily assembled and disassembled for shipping to beer distributor warehouses. In alternative embodiments and situations, the Keg Installer can be used with only the Plateau and the Outbound Ramp, eliminating the Inbound Ramp. The option is up to the beer distributor warehouse. By removing the Inbound Ramp, a forklift can be driven up directly to the Plateau portion of the Installer, and the keg can be moved off of the forklift onto the Plateau to complete the installation.

Figure 5:
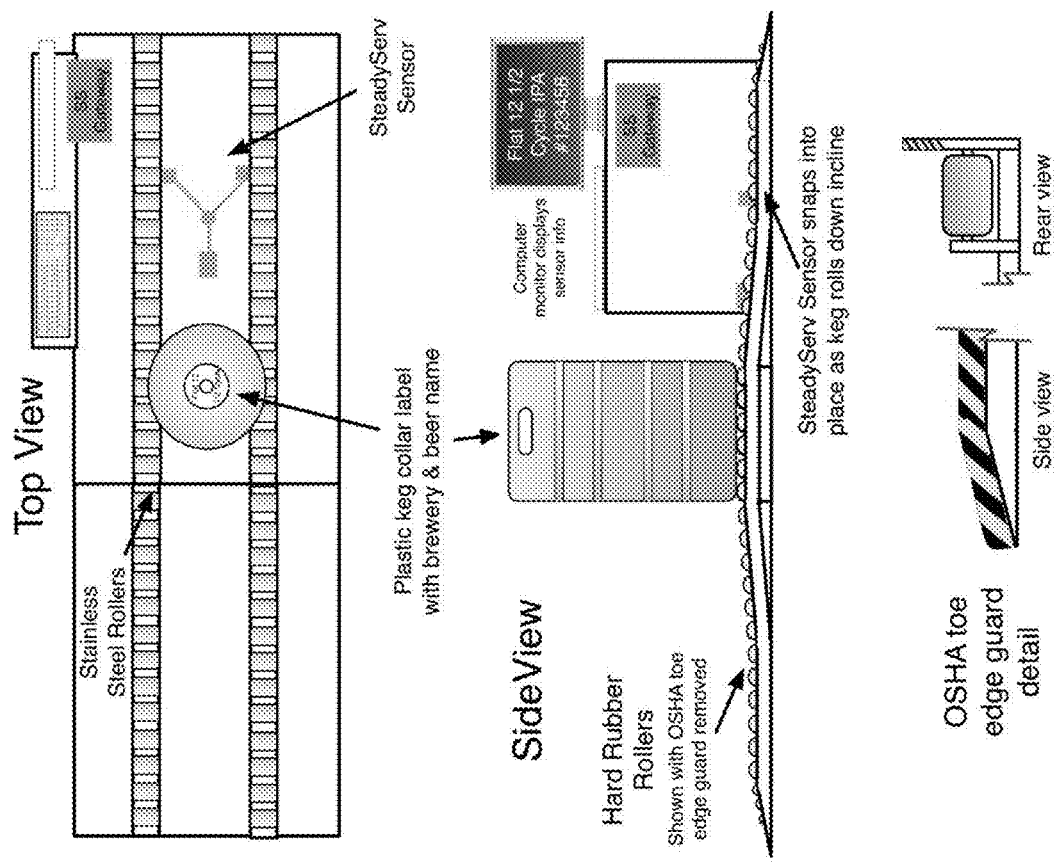
FIG. 5 is a top/side/rear view of a sensor installation apparatus for use in various embodiments.

The Keg Installer is both a mechanical installer of the Keg Sensor/Transmitter plus is a point at which a warehouse worker can check to be sure that the keg on which he is installing the Keg Sensor/Transmitter matches the Order Pick List. As shown in FIG. 5, a small computer and monitor will be mounted to the Keg Installer. In addition, an Uplink/Gateway will be mounted on the Keg Installer. This Uplink/Gateway will have a desensitized receive antenna so that it only receives the Keg Sensor/Transmitter that is being installed onto the keg. As the worker rolls the keg through the installation process, they can perform a visual check to make sure that the content of the keg they have in front of them on the Installer matches what the SaaS system says it should be, plus it matches the Order Pick List. That Order Pick List in some embodiments will be a piece of paper with the order written on it, while in other embodiments the SaaS system will have an EDI (Electronic Data Interface) connection to the beer distributor's inventory system.

So, for example, the keg that is being rolled onto the Installer may have a paper keg collar. A paper keg collar clipped on a keg's top valve is a common way of identifying the contents of a keg. The worker looks at the keg collar and sees that the beer in the keg is identified as "Bell's Founder's Ale". As the worker installs the Keg Sensor/Transmitter the unit transmits its serial number as KS1234 thru the Uplink/Gateway. The SaaS application displays on the computer monitor that the sensor is associated to the SKU for "Bell's Founder's Ale," and that confirms the correct Sensor Transmitter is being put on the correct keg. The SaaS Software also displays the Order Pick List and the warehouse worker can confirm that it is the correct keg/product to go out.

Figure 6:
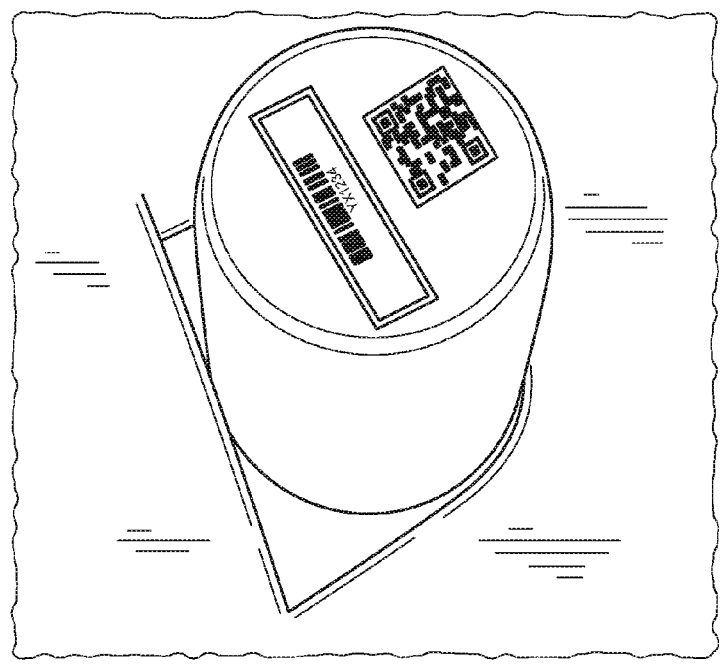
FIG. 6 is a schematic diagram of a sound wave-based keg volume sensor for use in various embodiments.

The Top-Mounted Keg Sensor/Transmitter shown in FIG. 6 is a sound wave-based unit that will be mounted on the top of a keg in some embodiments of the present system. The Top-Mounted Keg Sensor/Transmitter may be mounted with its bottom surface sensor side flush and flat with the top surface of the aluminum keg. To accomplish that flush mounting, we will use a top-mounted keg bracket made out of aluminum and steel. The bracket is approximately 6 inches in length. At the top of the bracket is a "Y"-shaped fork, and at the bottom of the bracket is a "T"-shaped end. In the middle is the actual Keg Sensor/Transmitter, which is approximately 3 inches square. The Top-Mounted bracket is designed with a pressure spring, hand lever, and lock. The bracket is placed on the top of the keg with the "Y" shape up against the keg valve. A branch of the "Y" sits on either side of the valve. The "T"-shaped end rests in the outer edge of the top of the keg. The bracket is put into place, the hand lever is pushed down which creates pressure on the spring and flexes out and bows the bracket out and down. The bracket flexes out the "Y" and the "T," and the hand lever locks into place, securing the bracket to the keg with equal and opposing force on the "Y" at the valve and the "T" at the edge of the keg top. The force also pushes the Keg Sensor/Transmitter firmly onto the top of the keg with the downward force. The action of the bracket in this embodiment is similar to the concept behind a snow ski binding. The bracket can be removed by unlocking the lever, the force is removed, and the bracket is free.

The majority of beer kegs used by craft brewers in the county are leased from one of two keg leasing companies. In certain embodiments, agreements with keg leasing companies and with keg manufacturers allow a more permanent mount to be included on kegs for the Top-Mounted Keg Sensor/Transmitter.

The design form that may be used for the top-mounted sensor is similar to a large hockey puck. The flat side of the "puck" would sit on top of the keg, pressed against the top surface. In some systems, the data vendor works with keg manufacturers and keg-leasing companies to spot-weld an aluminum bracket to the top of each keg. The Top-Mounted Keg Sensor/Transmitter would then be attached to the top of the keg by attaching it to this welded bracket. In some embodiments, this design would be very similar to a bayonet-mount camera lens. The round-shaped Top-Mounted Keg Sensor/Transmitter would have a three-pronged male bayonet mount. The bracket mounted on the top of the keg would have a recessed female bayonet mount. The Keg Sensor/Transmitter would be placed on the top of the mount, and with a one-quarter clockwise twist, the Keg Sensor/Transmitter mount would be securely mounted onto the keg.

The Uplink/Gateway in this embodiment is a self-contained unit that is mounted on the wall outside of the beer cooler of an on-premises retailer (bar or restaurant) that contracted with their local beer distributor to use the service described herein. The Uplink/Gateway is a moisture-resistant, shock-resistant plastic box that contains radio receivers, computer hardware, computer software, and radio transmitters. Each Uplink/Gateway has its own unique serial number that is embedded into the Uplink/Gateway software.

Figure 4:
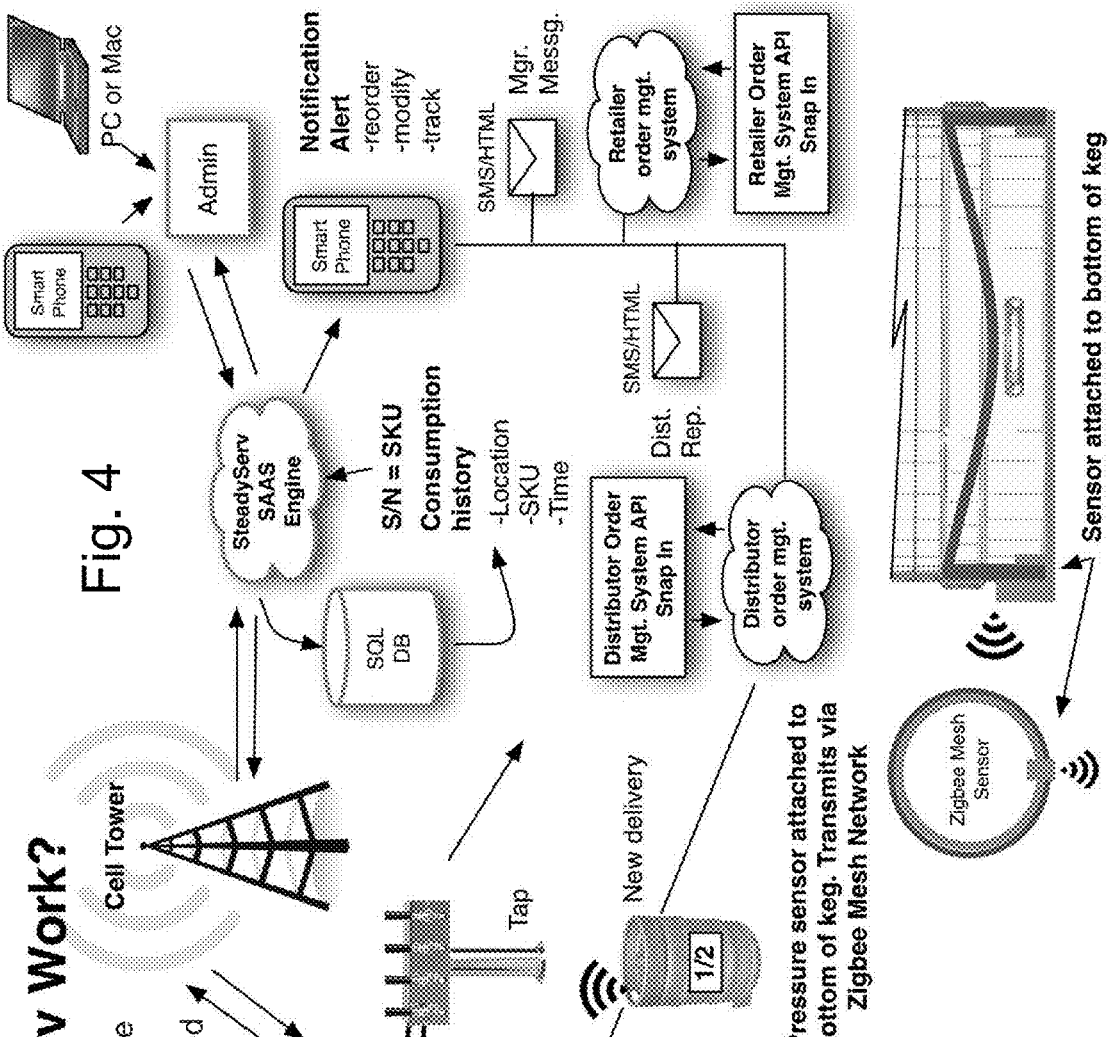
FIG. 4 is a schematic diagram of a bulk beverage information collection, management, processing, and action system according to one embodiment.

The Uplink/Gateway consists of two major areas and functions. The Zigbee hardware radio receiver and software stack receives the data transmissions from each Keg Sensor/Transmitter within its range, which are typically the Keg Sensor/Transmitter(s) in the nearby cooler. The receiver receives the data, organizes the data, and tags the data with information unique to the individual Uplink/Gateway including the unit's unique serial number and version number. Once the Zigbee receiver and software stack has organized that data, it is sent to the CDMA cell phone gateway. This overall system is illustrated in FIG. 4.

The CDMA Uplink/Gateway is a transmitter/receiver that contains both radio hardware and software. The CDMA Uplink/Gateway in some embodiments will be constructed with specifications provided by a wireless carrier partner, such as Verizon Communications. (In other embodiments, of course, GSM and/or other wireless data transmission protocols are used instead of or in addition to CDMA.) The Uplink/Gateway will join the carrier's data service by connecting the closest cell phone tower to the on-premise retailer where the Uplink/Gateway has been placed. The Uplink/Gateway relays the data from the Keg Sensor/Transmitter(s) that has been collected by the Zigbee receiver. The CDMA Uplink/Gateway will communicate with the carrier's network to determine the longitude and latitude of the Gateway and will transmit that data, its software version number, and the data collected by the Zigbee receiver to the SaaS Software.

After the Keg Sensor/Transmitter is attached to the keg, the keg is delivered to the on-premise retailer, a bar or restaurant that sells draft beer. At the retailer the keg is placed in the retailer's keg cooler. Once the keg is placed in the cooler, it is now in radio range to join a mesh network that includes the Keg Sensor/Transmitter of each keg in the cooler as well as the Uplink/Gateway. As soon as the keg is placed into the cooler, the Keg Sensor/Transmitter begins transmitting data. The data transmitted includes the weight parameter (0-20) from the sensor, the Sensor Transmitter Serial Number (e.g., #KS1234), and the version number of the software (ver1.0). This collection of data is transmitted to the Uplink/Gateway. The Uplink/Gateway acts as a conductor collecting data from all Keg Sensor/Transmitters in the cooler and maintains its own serial number (#UG5678) and its own location longitude and latitude data (e.g., latitude: 39.77572 longitude: −86.15569). The Uplink/Gateway collects Sensor Data then adds its own data that is transmitted via the carrier's CDMA cell phone data network to the SaaS software. So an example data feed would look like:

Keg Sensor/Transmitter sends a data string:
keg_sensor_serial=KS1234&;weight_parameter=10&;
keg_sensor_version=1.0&;gateway_version=1.0

This data string is received by the Uplink/Gateway, and the Uplink/Gateway embedded software adds its data. The combined data string in this example would then be:
uplink_gateway_serial=UG1234&;long=39.77572&;
lat=−86.15569&;=5&;keg_sensor_serial=KS1234&;
weight_parameter=10&;keg_sensor_version =1.0&;
gateway_version=1.0

When there are multiple Keg Sensor/Transmitters in a cooler, the combined data string would look like:
uplink_gateway_serial=UG1234&;long=39.77572&;
lat=−86.15569&;=5&;keg_sensor_serial=KS1234&;
weight_parameter=10&;keg_sensor_version =1.0&;
gateway_version=1.0&;keg_sensor_serial=KS5678&;
weight_parameter=4&;keg_sensor_version=1.0&;
gateway_version=1.0&;
keg_sensor_serial=KS91011&;weight_parameter =3&;keg_sensor_version=1.0&;gateway_version=1.0

The data is collected and sent by the Uplink/Gateway through the CDMA cell data network, then over the Internet to the SaaS software. Upon receipt by the SaaS software, the collected data from the Keg Sensor/Transmitter is correlated and saved in the database in several different ways.

The Keg Sensor/Transmitter Serial Number is correlated to an SKU that matches the beer brand and type. The correlation between the Serial Number and SKU has been pre-programmed into the SaaS Database. For example, if Serial Numbers KS0000 through KS1234 have been assigned SKU998877665544, which is beer brand and type "Bell's Founder's Ale," then when the SaaS software receives data from Keg Sensor Serial Number KS1234, the SaaS software writes the data into the database as being associated with that SKU, beer brand and type "Bell's Founder's Ale." The SaaS software has programmed intelligence that also converts the weight parameter into a percentage of volume. So, for example, if the Keg Sensor sends a weight measurement of 10 on a scale of 0-20, that means the keg is half-weight, thus half-full. The SaaS software converts weight to volume. 20 is full, 100%. 0 is empty, 0%. The scale of 0-20 is, therefore, converted by the SaaS software to 20 steps of volume in percentage units.

The Uplink/Gateway adds its data to show the location of not only the Uplink Gateway, but also the location of the Keg Sensor/Transmitters that it is collecting data from in its coolers. Say, for example, that we in the SaaS software the Uplink/Gateway serial number UG1234 has been assigned to the location of retailer "Scotty's Bar and Restaurant." So when the transmission of data from a Keg Sensor/Transmitter is made through the Uplink/Gateway, the location of the keg is known. So, for example, a Keg Sensor/Transmitter KS1234 with weight parameter 10 may be transmitted to the SaaS software thru Uplink/Gateway UG1234. The SaaS Software has presumably already stored the location data of the Uplink/Gateway, the association of the Keg Sensor/Transmitter to SKU Beer Type, and the conversion of weight to volume. When each transmission of data occurs in this embodiment, the SaaS database assigns a date and time stamp converted from UTC (Coordinated Universal Time) to local time. So when the transmission of data occurs, and the SaaS software receives the data, the data is converted to report that the particular keg of "Bell's Founder's Ale" currently located at "Scotty's Bar and Restaurant" is 50% full at 10 PM today.

KS1234=Bell's Founder's Ale
UG1234=Scotty's Bar and Restaurant
Volume=50% (Weight value of 10 converted to %)
Date-Time=5.24.12 10:00 PM The embedded software in the Keg Sensor/Transmitter has intelligence built in. For example, it regulates the time factor of how often the data is transmitted from the Keg Sensor/Transmitter to the Uplink/Gateway. In one example, the software is set to send data every hour time period, but that time period can be changed. The Keg Sensor/Transmitter software has the intelligence to only transmit data if the weight value has changed. In the future, the Keg Sensor/Transmitter will also have the ability to transmit the ambient temperature around the keg (cooler temp) and the Keg Sensor's remaining battery life as a percentage.

Figure 7:
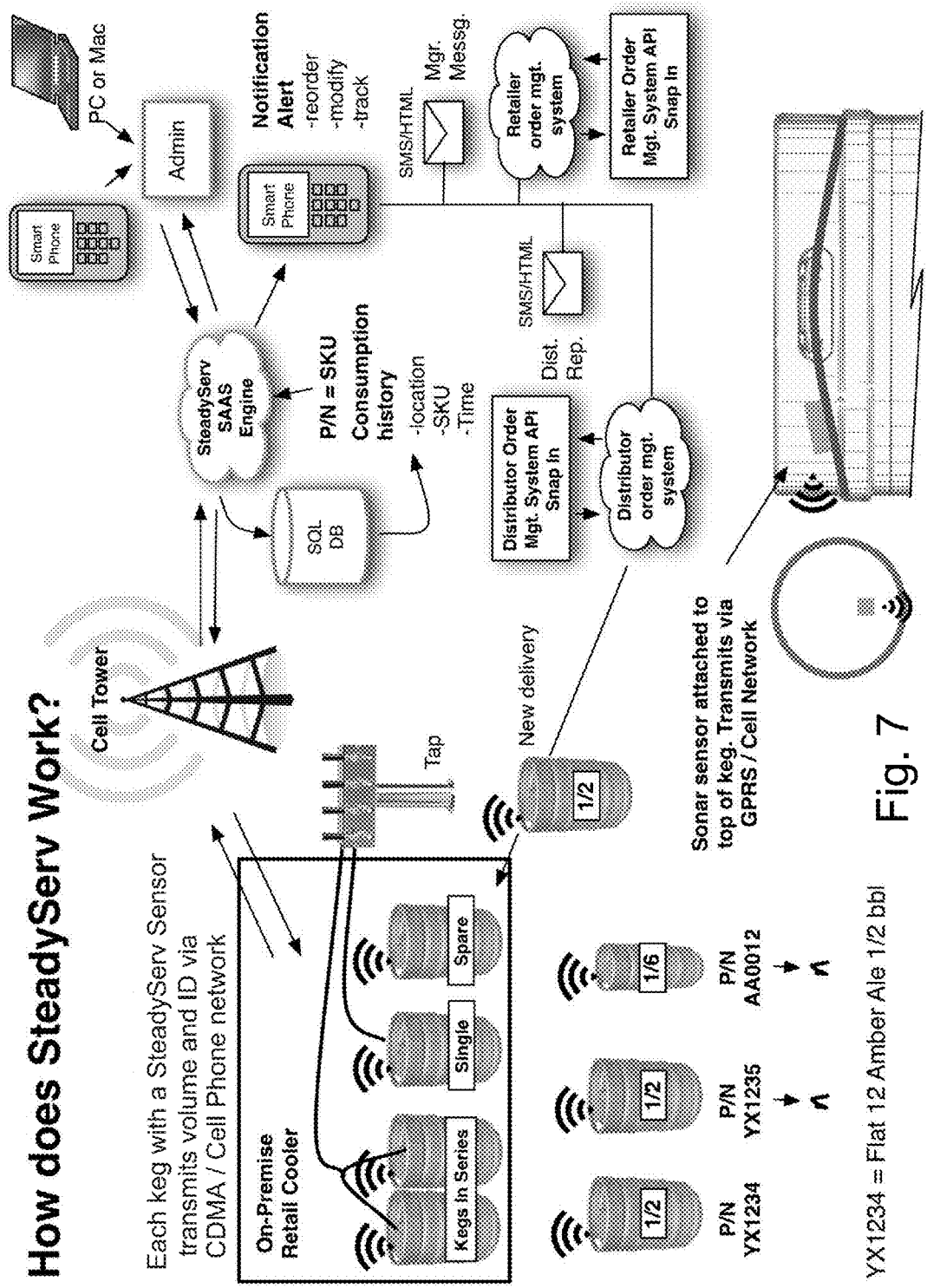
FIG. 7 is a schematic diagram of a bulk beverage information collection, management, processing, and action system according to a second embodiment.

One design of the Keg Sensor/Transmitter uses short-range Zigbee radio technology to connect and send data thru the Uplink/Gateway. An alternative design, an example of which is illustrated in FIG. 7, eliminates the Uplink/Gateway step by providing the Keg Sensor/Transmitter itself a direct CDMA cell data connection so that the Keg Sensor/Transmitter will transmit its data directly to the SaaS Software.

Still further versions of the Keg/Sensor Transmitter will change from the bottom-mounted weight sensor, to a top-mounted sensor. The top-mounted Keg Sensor/Transmitter uses sound wave technology to send a sound wave through the top of the keg. The sound wave will bounce off the top of the liquid (beer) and return to the Keg Sensor/Transmitter. The interval of time between the time at which the sound wave was sent and the time at which the return sound wave was received would be measured. This measurement would be transmitted to the SaaS Software, which will convert the time interval into a percentage of volume of the beer remaining. A short time interval would mean a fuller keg. A longer time would mean an emptier keg.

Figure 8:
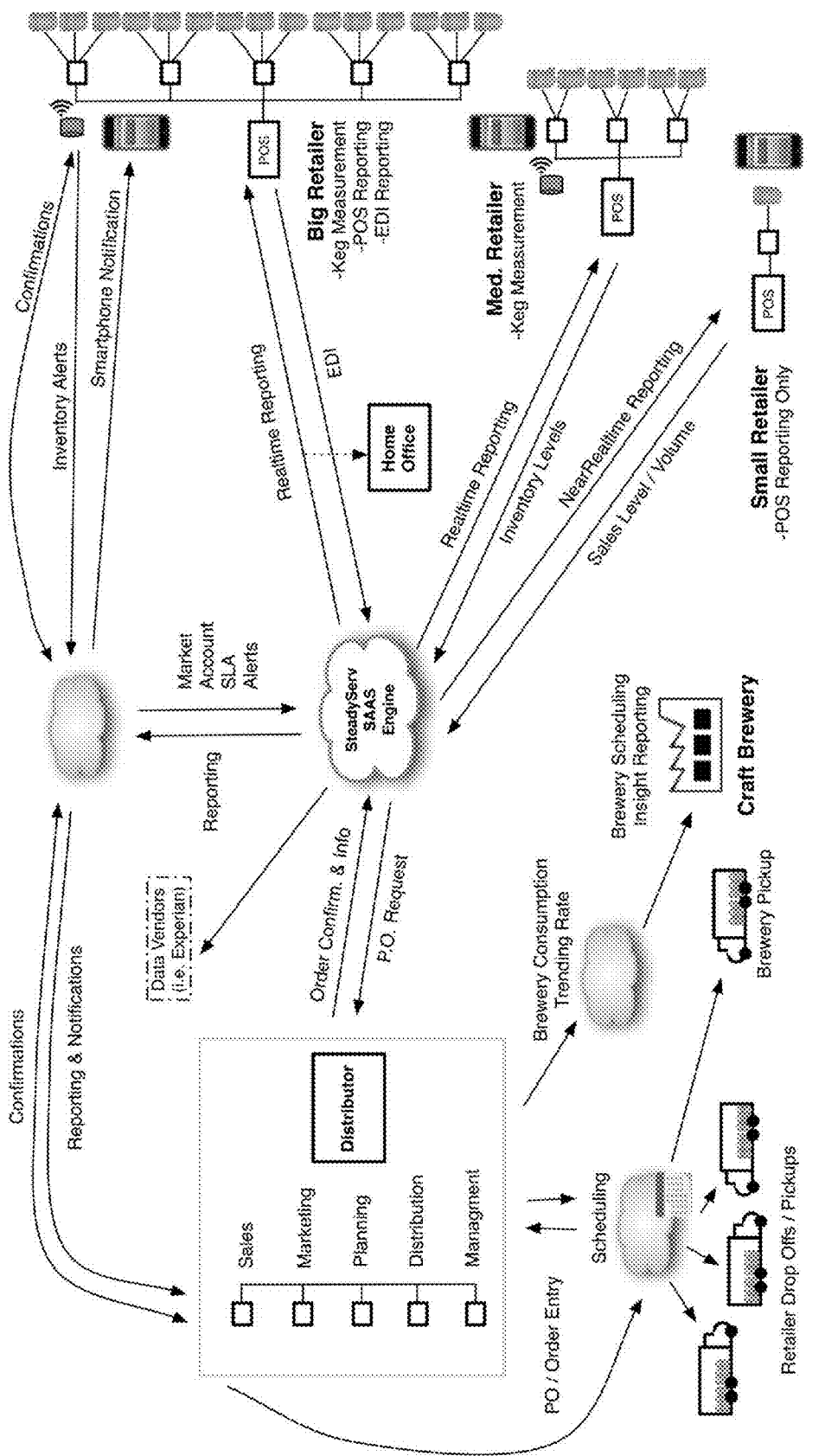
FIG. 8 is a schematic diagram of distribution, reporting, ordering, and processing of bulk beverage information.

Now that we have the basic keg volume, date time, and location data coming from the Keg Sensor/Transmitter through the Uplink/Gateway into the SaaS Software database, we can talk about how we act upon the gathered data. FIG. 8 provides a schematic illustration of some such actions, while others will occur to those skilled in the art in view of this disclosure.

There are several levels of use of the gathered data that in the illustrated embodiments is now in the SaaS Software. The SaaS Software will be set up with individual accounts for each Bar and Restaurant retailer using the service. A representative of the retailer will set up accounts for each individual in their organization who interacts with keg beer. The setup process will include adding each individual's smart phone/mobile phone number. The representative will set up rules based on their organization's individual needs. A key function in the day-to-day operation is to be able to have an insight into the current status of their keg beer inventory. The representative can log onto the SaaS software, then review current inventory and set rules for alerts based on depletion rates of keg beer. In various embodiments, these alerts take on the form of SMS text sent to mobile phones, popup push alerts that are part of iPhone, Android and other smart phone formats, emails sent out, recorded voice alerts sent to phones, and other forms that will occur to those skilled in the relevant technologies. The alerts will only be sent to retail workers based on their current location. The system software will take advantage of the location-based service built into each smart phone. The worker will only get alerts if they are in the geographical longitude and latitude area that has already been defined in the SaaS database by the recording of the Uplink/Gateway assigned to their place of work. This will assure that workers will not get alerts during their off-shift hours. A manager who would like to get alerts when they are off-site from their retail location can override this function.

In other embodiments, alerts take the form of visual flashing lights and integration into other software in the restaurant including, but not limited to, POS terminals (Point of Sale, electronic "Cash Registers").

The retail representative can assign a value to certain beer brands and types and customize alert based on the value of the beer, that is, the importance of not running out of that beer. For example, the retailer might not value the "Stroh's Light" beer as much as the "Bell's Founder's Ale." So the retailer representative might set up the SaaS software to automatically alert the designated retailer representative when the Stroh's reaches 10% remaining, while the more valuable Bell's would automatically alert when the remaining beer registers in the SaaS system as 40% remaining. In alternative embodiments, patterns in the rate of consumption of each product are taken into account, and depletion events are forecasted so that alerts can be raised and orders can be placed "just in time."

When an alert is sent to the retailer, there are four paths that they can use to re-order the keg that is running low. If the alert comes to the retailer's phone, they can re-order by sending an SMS text message directly to their beer distributor sales rep, or by sending an SMS text message to an SMS gateway that is controlled by the system vendor and connected by EDI (Electronic Data Interchange) into the beer distributor's ordering system. Another option would be to activate a button in the user interface to initiate a voice call to their beer distributor's sales rep. Plus, there will be an iPhone and Android smartphone application that will have a re-ordering function built-in, connecting by EDI to the beer distributor's ordering system. The interface of the smartphone application would have a visual alert with the button option "re-order now," which the retailer can choose.

Finally, the retailer can set their account to have the SaaS software automatically submit re-orders on kegs based on rules they set for each brand and type of beer. For example they can set a rule to automatically re-order "Bell's Founder's Ale" if the depletion level has dropped below 40% and the day of the week is Wednesday thru Friday.

Retailers will have a set of standard reports accessible to them via the SaaS web-based platform or mobile app. These reports would include current and past inventory reports, current and past keg depletion rates, and other reports key to their operation.

Beer distributor sales representatives will be able to see all of their accounts and the current state of each retailer's keg inventory. The sales representative can see when alerts on low kegs were sent out to retailers, who the alert was sent out to, and what action (if any) was taken by the retailer to re-order the depleting, or depleted, keg. The management of the beer distributor has a near-real-time view of current beer depletion across all of their retail accounts. This near-real-time data will allow them to more efficiently control their inventory of kegs in their warehouse based on trends in usage.

The near-real-time data that the presently disclosed process will be collecting can also be used by breweries to determine what beers are being sold and at what rate. They then can adjust what beers they are planning to brew and in what quantity they brew the beer. In the case of large breweries they can adjust the purchasing of the ingredients of beer components on the grain futures market. The system vendor can also sell data to marketing data firms who track trends in consumer consumption.

As will be appreciated by those skilled in the art, and API (Application Programming Interface) will be developed to allow other applications to access system data for real time software applications.

An example would be a consumer "Beer Finder" smartphone application. The smartphone application would integrate into the operation system of the smartphone and be able to find the phone's exact location in longitude and latitude. The app would then send a query the SaaS Database thru the API to find out the closest Keg Sensor/Transmitter and Uplink/Gateway to the person using the smartphone app. Near real time data of volume of a brand and type of a beer as well as its longitude and latitude location has already been recorded from the Keg Sensor/Transmitter and Uplink/Gateway. So the smartphone app could show that "Bell's Founder's Ales" is at "Scotty's Bar and Restaurant," which is X miles away from your location. The location could be plotted on a map. Plus the app could get the data that the keg is currently 50% full and do the math to determine (and display) that there are "currently 110 pints left" of this beer.

Simple social media integration services will be created for the retailer using techniques understood by those skilled in the art. Using the data already in the SaaS Database, social media alerts can be sent automatically based on rules set by the retailer. That retailer will be prompted during their initial SaaS web setup to have the option of sending a TWITTER tweet or FACEBOOK status update when a new keg of beer is tapped. They would enter in their social media account name and password, then choose a template social message like:

"Just wanted to let you know that we just tapped a new keg of <BEER BRAND AND TYPE INSERTED HERE> at <NAME OF BAR-RESTAURANT LOCATION>. Come on down and get a pint now!#greatbeer"

For example, say that retailer was "Scotty's Bar and Restaurant," and they have a new, full and untapped, keg of "Flat 12 IPA" in their cooler. This keg has a Keg Sensor/Transmitter that is reporting a weight value of 20, which translates into a 100% full keg. Once that keg is tapped, the beer is flowing and being sold, and is now reporting a value of 19 the Twitter Tweet or Facebook Status Update is sent out:

"Just wanted to let you know that we just tapped a new keg of Flat 12 IPA at Scotty's Bar and Restaurant North Side. Come on down and get a pint now!#greatbeer"

Other embodiments include integration into POS terminals (Point of Sale, electronic "Cash Registers"). These POS terminals have their own APIs (Application Programming Interface) that would allow the SaaS Software to query into the POS database to extract data. This extracted data would then be added to the SaaS Database to be used for several purposes. For a given retailer, Keg Sensor/Transmitters may be on some but not all kegs in that retailer's cooler. By pulling out sales data for a tap that is serving a given brand and type of beer, but is coming from a keg that does not have a Keg Sensor/Transmitter, the SaaS application can estimate the keg depletion and the same alert rules and actions of re-order can be applied. In addition, a retailer can look at the depletion rate of a keg with a Keg Sensor/Transmitter and compare it with the POS data on that same keg as it is reported by the POS system. By comparing the real volume data obtained from the present system with the reported sales data, a retailer can assess waste and shrinkage on that tap from "free pours" (keg beer poured to patrons to gain tips, or pours to employee friends).

The Keg Sensor/Transmitter will be used in some embodiments to pinpoint the location of individual kegs in a warehouse.

Current technology for radio transmission and reception allows for location of a transmitted signal in a wide area. Using triangulation plotting a transmitter like the one on a Keg Sensor/Transmitter would be a broad area. In the embodiments described in previous sections of this document, the Sensor is put on a keg as it leaves the warehouse to be delivered to the retailer. In other embodiments, however, the sensor could be put on the keg as it is delivered from the brewery to the beer distributor warehouse. As shown in FIG. 9, additional location technologies, whether now existing (such as RFID) or hereafter developed, in such embodiments allow for pinpoint location of a keg in a warehouse. The location can be shown on a computer-drawn map of the warehouse showing the X-axis and Y-axis location of an individual keg, but also the Z-axis. The Z-axis is the height, as when the keg is stacked up on a shelf. So in the future if a beer distributor is missing a keg, or group of kegs, by using the present system they could locate the keg. There could be a plot on a screen that shows the missing keg is in row 2, aisle 3, shelf 3.

In the future the Keg Sensor/Transmitter will be a direct CDMA or other cellular data connection. Using the longitude and latitude data from each wireless-data-equipped Keg Sensor/Transmitter, each keg can be located when on the road for delivery and located after delivery to determine whether the individual keg has been delivered to the correct location or delivered in error to the wrong location.

Other uses would include bulk containers of soda, such as COCA-COLA or PEPSI, and containers of home-delivered water, such as ICE MOUNTAIN and CULLIGAN.

There are several brands of home keg coolers marketed to consumers. The Keg Sensor/Transmitter could be integrated into the design of these home coolers to measure the remaining beer and alert the consumer.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system comprising:
    a keg sensor/transmitter mounted to a bottom of a keg, the keg sensor/transmitter comprising:
        a weight sensor configured to determine a weight of the keg; and
        a transmitter configured to transmit the weight of the keg, and a serial number of the keg sensor/transmitter;
    an uplink/gateway configured to receive the weight of the keg and serial number of the keg sensor/transmitter, construct an uplink/gateway data string that comprise the weight of the keg, the serial number of the keg sensor/transmitter, and a serial number of the uplink/gateway; and
    a database configured to receive the uplink/gateway data string, and date and time stamp the uplink/gateway data string.

2. The system of claim 1 wherein
    the serial number of the uplink/gateway is associated with a location of the uplink/gateway.

3. The system of claim 2 wherein the database associates a location of the keg sensor/transmitter based on the serial number of the uplink/gateway.

4. The system of claim 1 wherein said database relates said weight of the keg, and said date and time stamp
    the brand of beer in a respective keg based at least on the serial number of the keg sensor/transmitter.

5. The system of claim 1 and further comprising at least one radio receiver device adapted for receiving data strings from said transmitter and for sending said data strings to said database.

6. The system of claim 1 wherein the uplink/gateway data strings further includes longitude and latitude data.

7. The system of claim 1 wherein said weight related data is collected periodically but said transmitter transmits said weight related data only if said weight value has changed.

8. The system of claim 1 wherein said database is adapted to send an alert when beer in a keg is running low based on the weight of the keg.

9. The system of claim 1 further comprising a consumer phone based application adapted to access said database and locate availability of a brand of beer at or near a location of said consumer phone.

10. A system including a plurality of keg sensor/transmitter mounted to a bottom of a respective keg of a plurality of kegs, the system comprising;
    each of the plurality of keg sensor/transmitter including:
        a pressure sensor configured to determine a combined weight of their respective keg and a liquid contained therein; and
        a transmitter configured to periodically transmit a respective keg sensor/transmitter data string, wherein the respective keg sensor/transmitter data string comprises the combined weight of their respective keg and the liquid contained therein, and a respective keg sensor/transmitter serial number;
    an uplink/gateway configured to receive the periodic transmission of the keg sensor/transmitter data strings from each of the plurality of keg sensor/transmitter, and compile an uplink/gateway data string comprising each of the plurality of plurality of keg sensor/transmitter data strings, and an uplink/gateway serial number, and further configured to transmit the uplink/gateway data string; and
    a database configured to receive the uplink/gateway data string.

11. The system of claim 10, wherein the database stores and relates the combined weight of their respective keg and the liquid contained therein from each of the plurality of keg sensor/transmitters to a purchaser of the respective kegs.

12. The system of claim 11 wherein said database further relates the combined weight of their respective keg and the liquid contained therein from each of the plurality of keg sensor/transmitters to time and date data.

13. The system of claim 11 wherein said database is adapted to send an alert when beer in a keg is running low.

14. The system of claim 11, comprising a consumer phone based application adapted to access said database and locate availability of a brand of beer at or near a location of said consumer phone.

* * * * *